United States Patent [19]
Leisner et al.

[11] Patent Number: 5,947,259
[45] Date of Patent: Sep. 7, 1999

[54] CONVEYER FOR THE TRANSFER OF WORKPIECES, IN PARTICULAR WORKPIECE CARRIERS

[75] Inventors: Ernst Leisner, Ditzingen; Heinz Clauss, Stuttgart; Peter Ulmer, Urbach, all of Germany

[73] Assignee: Robert Bosch GmbH, Stuttgart, Germany

[21] Appl. No.: 08/930,206

[22] PCT Filed: Dec. 21, 1996

[86] PCT No.: PCT/DE96/02506

§ 371 Date: Oct. 6, 1997

§ 102(e) Date: Oct. 6, 1997

[87] PCT Pub. No.: WO97/32802

PCT Pub. Date: Sep. 12, 1997

[30] Foreign Application Priority Data

Mar. 9, 1996 [DE] Germany .................. 196 09 201

[51] Int. Cl.$^6$ ..................................... B65B 47/00
[52] U.S. Cl. ....................................... 198/465.3
[58] Field of Search ................. 198/346.1, 463.3, 198/465.2, 465.3

[56] References Cited

U.S. PATENT DOCUMENTS 3,530,571  9/1970  Perry ........................ 198/346.1 X
4,643,630  2/1987  Shiiba et al. ................... 198/463.3
4,934,507  6/1990  Blocker ..................... 198/346.1 X

FOREIGN PATENT DOCUMENTS

3615064A1  5/1987  Germany .

Primary Examiner—Kenneth Noland
Assistant Examiner—K W Bower
Attorney, Agent, or Firm—Michael J. Striker

[57] ABSTRACT

A dual track conveying system for transporting workpiece carriers, has a main conveyor and, an auxiliary conveyor arranged parallel to the main conveyor. At least one transverse conveyor is arranged between the main conveyor and the auxiliary conveyor. The transverse conveyor is pivotally attached to the main conveyor. The moveable end of the transverse conveyor pivots up-and-to transfer the workpiece carriers from the transverse conveyor to the auxiliary conveyor. The transverse conveyor has a short belt and a long belt. The short belt is shorter than the long belt by the width of the auxiliary conveyor. A passive conveying track section following the path of the short belt is located in between the belts of the auxiliary conveyor to support one end of the work piece carrier when the moveable end of the transverse conveyor is in the raised position.

9 Claims, 3 Drawing Sheets

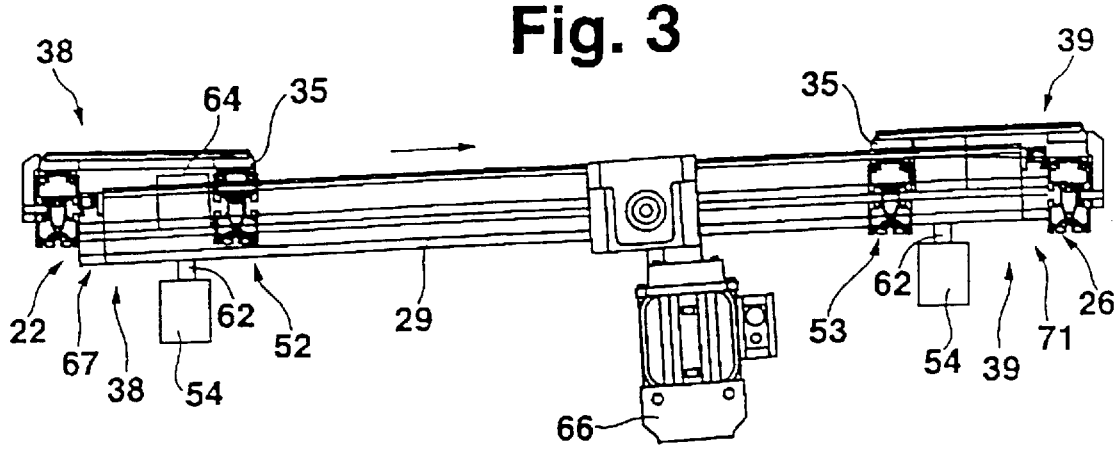
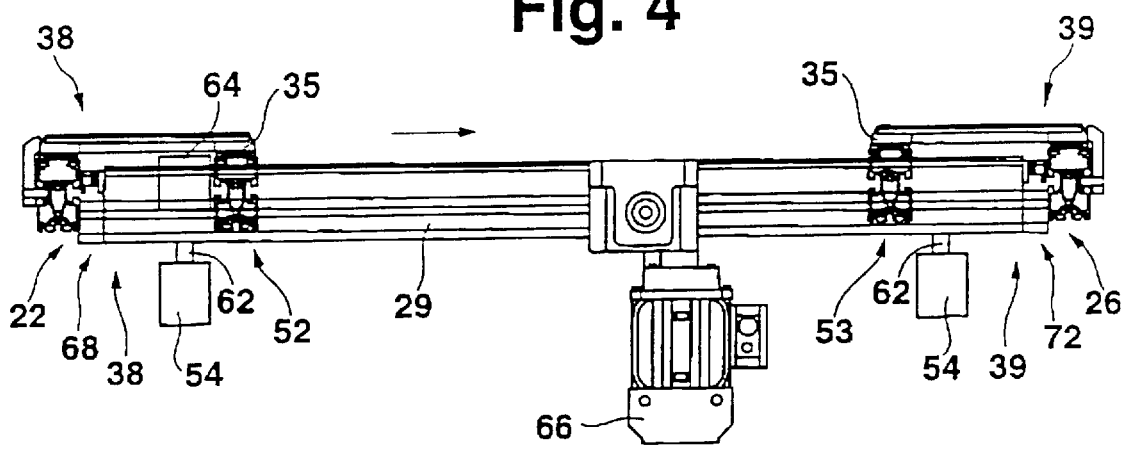
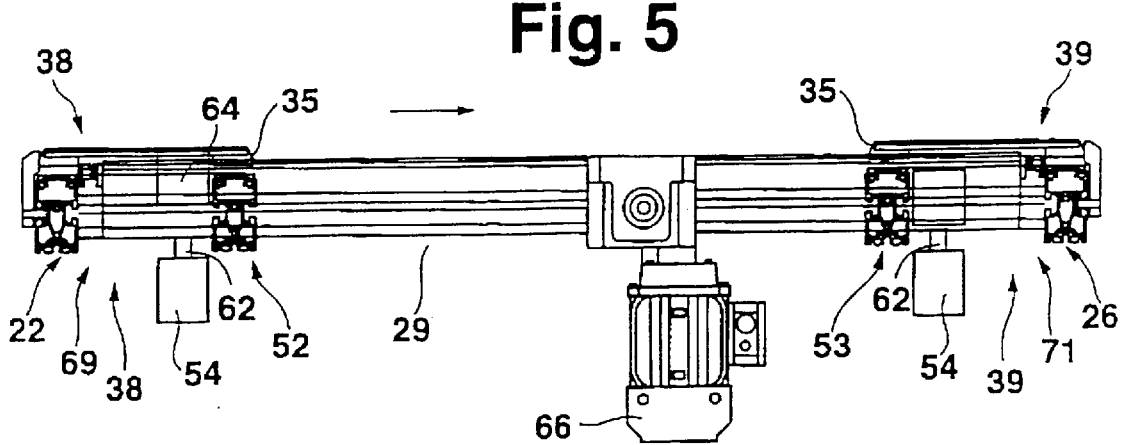

CONVEYER FOR THE TRANSFER OF WORKPIECES, IN PARTICULAR WORKPIECE CARRIERS

BACKGROUND OF THE INVENTION

The invention relates to a conveying system for transporting workpieces, in particular workpiece carriers.

Such a conveying device for transporting workpieces is disclosed in laid-open publication DE 36 15 064 A1. This conveying device has two parallel transport tracks and a transverse conveyor disposed between them, wherein the transport tracks respectively have an outward located conveyor belt with an endless band belt guided on rollers, and a respectively inward located roller system disposed at a distance from the conveyor belt. The transverse conveyor has a support frame arranged between the parallel transport tracks, which has an immobile center piece. Respectively one pivotably located end piece constitutes a transfer station. Each one of these end pieces intersects an inward located roller system of a transport track and covers the free space between the roller system and an outward located band belt of the transport track. Respectively one lifting device is associated with the two end pieces, by means of which the end pieces can be pivoted into several different vertical positions in respect to the transport track.

When designing such transverse conveyors it is necessary that the pivot axis, around which the end pieces can be pivotably arranged, has a defined distance from the inward located roller system, so that a passage over the roller system disposed between the end pieces of the transverse conveyor is made possible. Furthermore a part-intensive embodiment in the pivot range is required, so that the band belt of the end pieces can be driven. Because of the division of the transverse conveyor into end sections and a center piece, a multitude of different belt lengths is required.

Furthermore, a conveyor device for transporting workpieces has already become known, which has two parallel transport tracks and a transverse conveyor arranged between them. This conveying device is embodied as a single band belt system. The transverse conveyor, which constitutes an inserting or removal track, has a rigid frame which can be moved up or down by means of a lifting cylinder arranged in the respective end sections.

In connection with such single band belt systems it is necessary that the workpiece be arranged on the workpiece carrier in such a way that an even force distribution acts on the belt conveyor track as well as on the inward located roller system. As soon as the load distribution of the workpiece on the workpiece carrier lies more on the roller system, an interference-free operation during inserting or delivering the workpiece carrier can no longer be assured, since the frictional force acting between the workpiece carrier and the single band belt could be reduced. For this reason the transport belt is subjected to greater wear because of friction.

BACKGROUND OF THE INVENTION

The conveying device in accordance with the invention has the advantage that the conveyor track, which is embodied as one piece, allows a simplification of assembly and reduction in the assembly times. Furthermore, a modular construction is provided by this design. The conveyor track embodied as one piece is provided in the form of a dual belt conveyor, which permits a reduction of the mechanical. At the same time dependable inserting and removal or a dependable transfer of the workpiece carrier can be provided. Because of the design of the conveyor track as a dual belt conveyor at a transfer station, where the workpiece carrier is intended to be conveyed out transversely in respect to the conveying direction, it is made possible that a dependable removal is provided, even when the load distribution of the workpiece on the workpiece carrier is uneven. An inward located conveying track at an opposite end of the previously described end section is embodied shortened by the length of the transfer station. In the free space between a conveyor track embodied as a dual belt conveyor and arranged transversely to it, a passive roller system is provided, which can also be moved up and down with an outward located belt conveyor track. Because the workpiece carrier is already in movement on the dual belt conveyor ahead of the transfer station, the dependable insertion into a further conveyor track disposed transversely in respect to the conveyor track can take place even prior with the single belt system, it is not necessary for the workpiece carrier to be conveyed out of a position of rest.

The end sections of the inserting and removal tracks are seated in an up- and down-movable manner in the transfer stations for transferring the workpiece carriers from an inserting and/or removal track to a main conveyor track and/or auxiliary conveyor track. A design which reduced structural components and is cost-efficient can be provided by means of the rigid embodiment of the entire conveyor track over the length of the inserting and removal track. Furthermore, a considerable simplification of assembly can be provided by the arrangement of a passive roller system in an end section of the conveyor tracks.

it is possible by means of the independent up- and down-movable end sections of the inserting and removal tracks to perform an inserting and/or removal process in one end section without the opposite end section being affected by an inserting and/or removal process. At the same time the end section and/or sections of the inserting and removal track can also take up a position in which the workpiece carrier passes over the transfer station, wherein this position also has no effect on an opposite end section.

The up and down movement of the end sections of the inserting and/or removal track respectively takes place by means of a lifting element disposed in the end section, wherein a damping element is advantageously disposed between a support frame of the inserting and/or removal track and the lifting element. By means of this, a damped and low-noise transfer of the workpiece carrier from one conveying direction into a conveying direction extending transversely in respect to it. The tilting moments, which act on a conveyor track arranged transversely to the conveying direction, and which occur during the entry into the transfer station and when the workpiece carrier rests against a detent which blocks it in the conveying direction, can be intercepted and absorbed. Furthermore, such a damped seating of the support frame has the advantage that a compensation can take place during the tilting movement of the support frame, since the lifting elements can be arranged independently of each other in a lower, center or upper vertical position in the respective end sections.

In an advantageous manner, in connection with the inserting and removal tracks it is provided that the end section, which is disposed opposite the passive conveyor track, has ends of the conveyor tracks which are embodied to be of the same length. Because of this, belt conveyor tracks can project completely into the transfer station, so that the dependable removal of the workpiece carrier is provided. It is simultaneously possible to achieve a modular construction by this embodiment.

The main and auxiliary conveyor tracks advantageously have an end section located opposite the passive conveyor track, wherein the inward located conveying track is shortened by at least the removal conveyor track, which transversely enters the transfer station. It is possible by means of this to further increase the modular design of a transport conveying system. At the same time, dependable removal can again take place in a conveying direction, which is provided transversely in respect to the previous conveying direction of the workpiece.

BRIEF DESCRIPTION OF THE DRAWINGS

An exemplary embodiment of the invention is represented in the drawings in which.

DESCRIPTION OF THE PREFERRED EMBODIMENT

Figure 1:
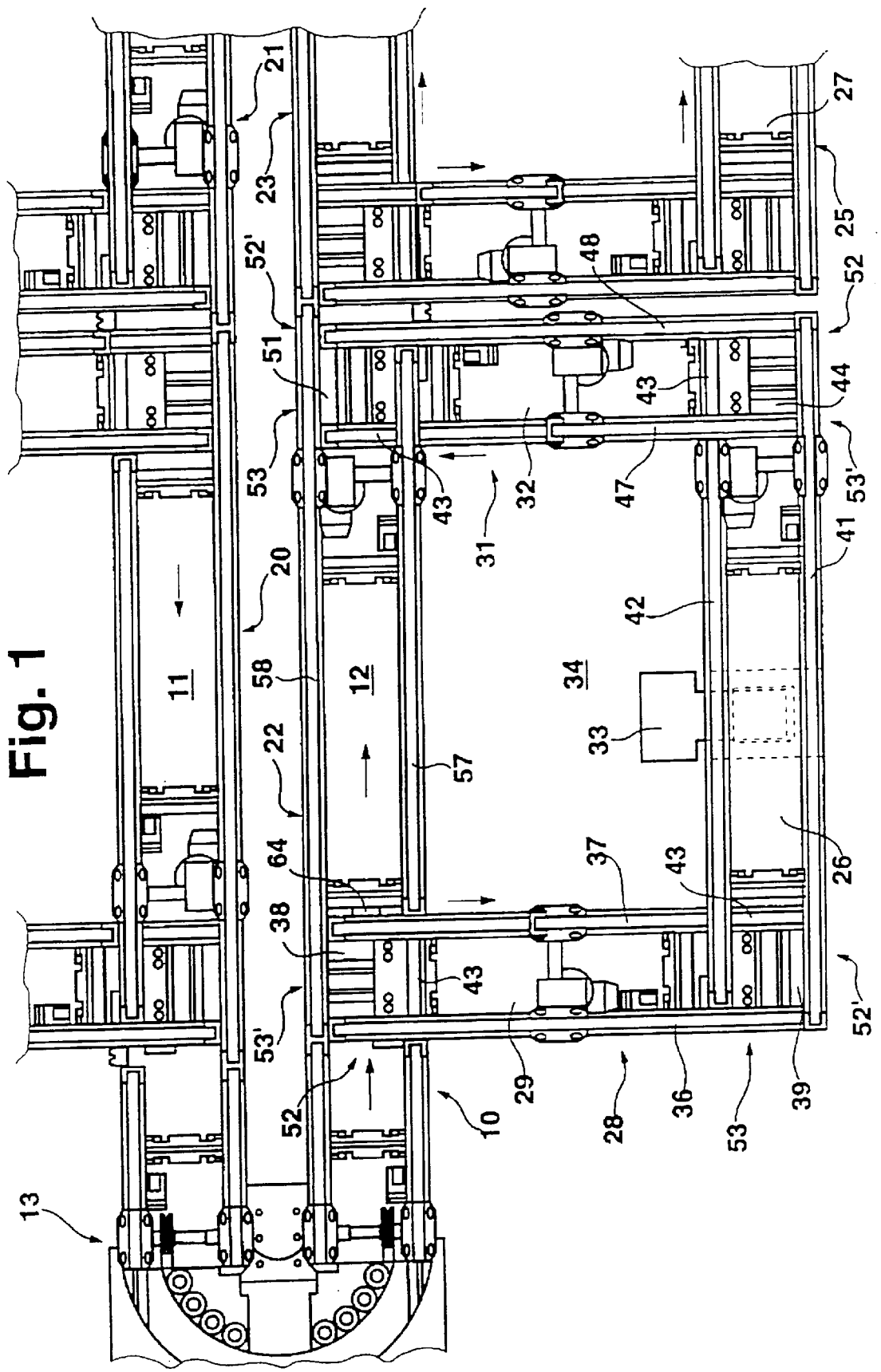
FIG. 1, a partial section of a conveying device represented in a schematic top view, FIG. 2, a schematic sectional representation of a lifting device with a transverse conveyor track which can be moved up and down, FIG. 3, a working position of the transverse conveyor track, FIG. 4, an alternative working position of the transverse conveyor track, FIG. 5, a further possible working position of the transverse conveyor track.

A partial section of a main circulating track 10 of a conveying device with a forward transport track 11 and a return transport track 12, which are arranged parallel with each other, is represented in FIG. 1. A reversing module 13 is respectively arranged at both ends of the forward and return transport tracks 11, 12. The main circulating track 10 is represented by several main conveyor tracks 20 to 23, arranged one behind the other, wherein the main conveyor tracks 20, 21 and, if desired, selectively still further main conveyor tracks, constitute the forward transport track 11, and the main conveyor tracks 22, 23, and, if desired, selectively still further main conveyor tracks, constitute the return transport track 12.

In the instant exemplary embodiment, the conveying device is embodied as a dual belt conveyor with the two conveyor tracks 11, 12, wherein each conveyor track 20 to 23, for example, has its own drive for the transport belts of the dual belt conveyor.

First and second auxiliary sections 26, 27 are arranged along the return transport track 12. The auxiliary track sections 26, 27 are respectively constituted by a removal module 28 with a removal track 29 and an inserting module 31 with an inserting track 32. The removal module 28 and the inserting module 31 are arranged at right angles between the two main conveyor tracks 22, 23, for example. A processing station 33 is provided in the auxiliary section 26, where parts arranged on the workpiece carrier 35 are processed.

The main conveyor track 22 and an auxiliary conveyor track 26 arranged parallel to it, as well as the removal track 29 and the inserting track 32, form a module 34, which will be explained by way of example. Several such modules 34 can be disposed one behind the other, because of which the main conveyor tracks 20 to 23, arranged one behind the other, constitute a forward transport track 11 and a return transport track 12 of a conveying device. The number of modules 34 can be selected as a function of the number of processing stations 33.

The removal track 29 has an outward located conveyor belt 36 and an inward located conveyor belt 37, both of which are embodied as belt conveyor. A transfer station 28 is formed in the intersecting area of the main conveyor track 12 with an end section 52 of the removal track 29, in which the two ends of the inward and the outward located conveying tracks 36, 37 are made of the same length. Opposite this a transfer station 39 is formed between an end section 53 of the removal track 29 and an end section 52' of the auxiliary conveyor track 26. In this case the conveying tracks 36, 37 of the removal track 29 mesh in a tooth-like manner with an outward located conveying tack 41 and an inward located conveying track 42 of the auxiliary conveyor track 26. The driven or actively inward located conveying track 37 is made shorter than the outward located active conveying track 36 of the removal track 29 and terminates at the front toward the inward located conveying track 42 of the auxiliary conveyor track 26. The inward located conveying track 37 is supplemented by a passive conveying track section 43 in the transfer station 39 between the outward located conveying track 41 and the inward located conveying track 42, so that the inward located conveying track 37 and the passive conveying track section 43 have a conveying track 37 and the passive conveying track section 43 have a conveying track of the same length as the outward located conveying track 36.

The passing conveying track section 43 is embodied as a roller track. This passive conveying track section 43 is disposed at a distance from the active inward located conveying track 37, which essentially corresponds to the width of the inward located conveying track 42 of the auxiliary conveyor track 26. The inward located conveying track 42 of the auxiliary conveyor track 26 extends in this free space formed by the spacing and terminates at the front toward the outward located conveying track 36 of the removal track 29. At the front, the outward located conveying track 36 of the removal track 29 borders the outward located conveying track 41 of the auxiliary conveyor track 26. The transfer point 39 is formed by means of this arrangement and embodiment of the end section 53 of the removal track 29 and the end section 52' of the auxiliary conveyor track 26. In the process the end section 53, 52' mesh in the manner of teeth with each other. The transfer stations 39 and 51 are designed in the same way.

A removal track 39 designed in this way then has the advantage that when a workpiece carrier 35 is transported out of the transfer station 38 in the direction toward the transfer station 39, two driven or active conveyor tracks 36, 37 are provided, so that the assured removal of the workpiece carrier 35 out of the transfer station 38 is provided.

When the workpiece carrier 35 enters the transfer station 39, it is transported via the outward located conveyor track 36, wherein the passive conveying track section 34 supplements the end section parallel with it. Because of the workpiece carrier 35 already being moved in the transport direction, one active conveying track 36 in the transfer station 39 can suffice to assure that the workpiece carrier 35 can be completely moved into the transfer station 39.

In the transfer station 39, the end section 52' of the auxiliary conveyor track 26 has outward and inward located conveying tracks 41, 4 made of different length. A further transfer section 44 is provided, located opposite the transfer station 39, in which the workpiece center 35 is placed from the auxiliary conveyor track 26 to the inserting track 32. The auxiliary conveyor track 26 has an end section 53' of the outward and inward located conveying tracks 41, 42 which corresponds to the end section 53 of the removal track 29 and constitutes a part of the transfer station 39. The outward located conveying track 41 extends over the entire auxiliary conveyor track 26. The inward located conveying track 42 is made shorter and borders an inward located and transversely to the inward located conveying track 42 extending conveying track 47 of the inserting track 32. In an extension of the inward located conveying track 42, a passive conveying track section 43 is provided between the inward located conveying track 47 and an outward located conveying track 48 of the inserting track 32.

Such an embodiment of the intersection area with an inside located conveying track 57 and an outward located conveying track 58 is also provided in a transfer station 51 of the inserting track 31 to the main conveyor track 22.

Dependable removal from and insertion into the transfer stations 38, 39, 44, 51 is provided by the end sections of the removal and inserting tracks 29, 32 and of the end sections of the main conveyor track 22 and auxiliary conveyor track 26.

The removal and the inserting modules 28, 31 are disposed in the transfer stations 38, 39, 44, 51 to the upwardly and downwardly movable for delivering and inserting the workpiece carrier 35. The up and down movement of the end section 52 in the transfer station 38, 44, and of the end section 53 in the transfer station 39, 51 of the removal track 29 and the inserting track 31 is respectively performed by means of a lifting unit 54, which is associated with the end sections 52, 53 and is represented in a sectional view in FIG. 2. The lifting unit 54 corresponds to a block cylinder, known per se. In this case it is a double-acting lifting cylinder, which can move the end section 52, 53 into different vertical positions. Alternatively it is also possible to provide hydraulically, electromagnetically or electrically driven lifting units.

Figure 2:
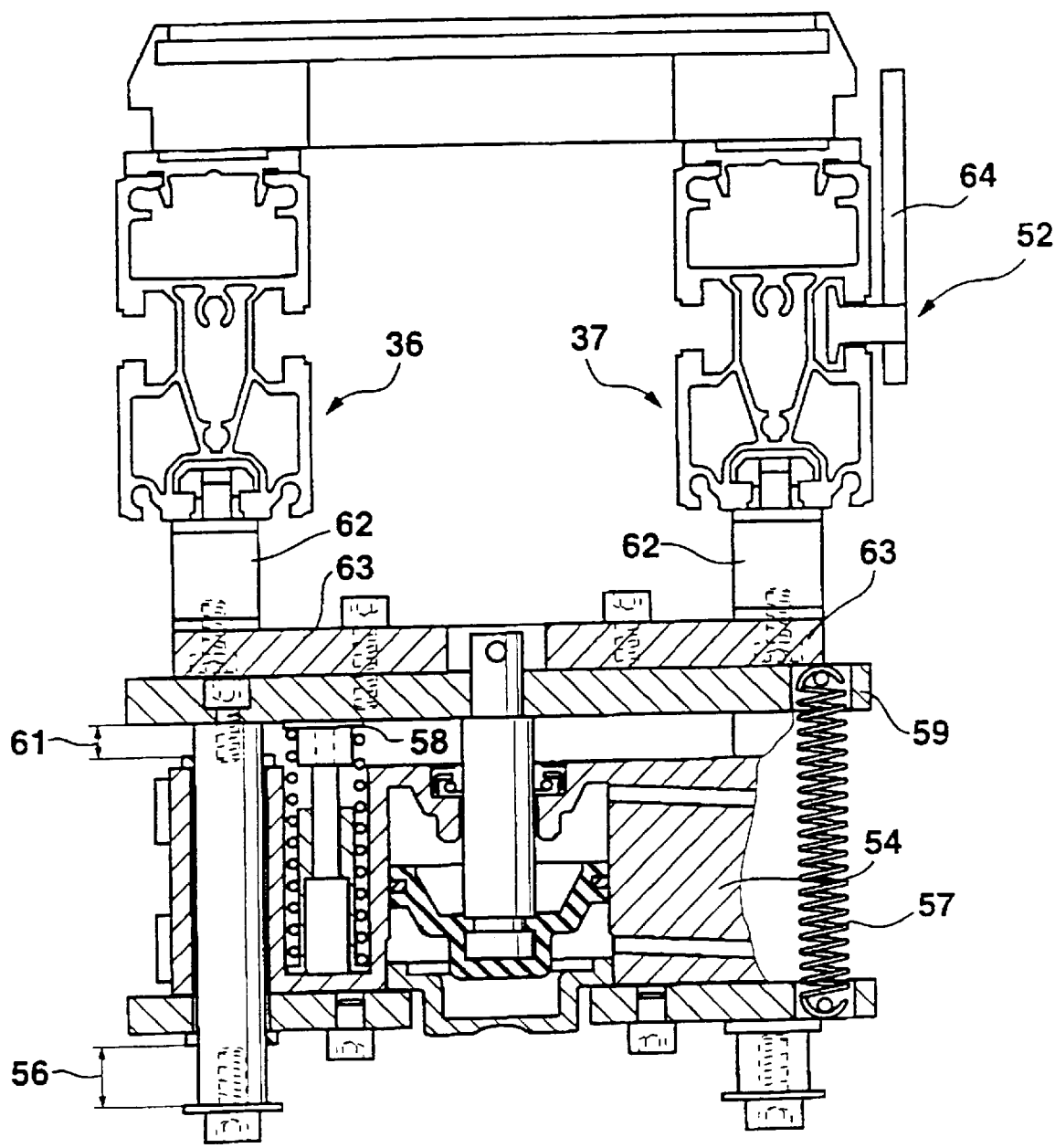

A center position of the lifting unit 54 is represented in FIG. 2 in which it is possible, for example, to stop a workpiece carrier 35 entering the transfer station 38 by means of a detent 64. To lift the workpiece carrier 35 out of the main conveyor track 22, the lifting unit 54 is charged with compressed air, so that the end section 52 is moved over a lifting path 56 into an upper vertical position. After the workpiece carrier 35 has been conveyed out of the transfer station 38, the lifting unit 54 can be moved into a center position as represented in FIG. 2. In this case the lifting unit 54 can be unpressurized, wherein a restoring spring 57 and a pressure spring 58 can be placed into equilibrium and transfer a base plate 59, on which the end section 52 of the removal track 29 is seated, into a center position.

If a workpiece carrier 35 is to pass through the transfer station 38, a second chamber of the lifting unit 54 is charged, so that a movement of the base plate over a stroke 61 into a lower position takes place. Because of this the end area 52 of the removal track 29 with the detent 64 sinks downward, so that this transfer statio 38 can be passed. After this has taken place, the lifting unit 54 can be made pressureless, by means of which it can again be moved into a center position.

The outward and inward located conveying track 36, 37 is respectively disposed via a damping element 62 in respect to the base plate 59 or an intermediate plate or adapter place 63, disposed on the base plate 59. These damping elements 62 are embodied to be elastic, so that a damped seating of the removal track 29 and the inserting track 32 is provided. These damping elements can be made of an elastic plastic, or in the form of air cushions or other damping elements, which have a damping effect in the conveying direction as well as transversely to the conveying direction.

As soon as a removal of the workpiece carrier 35 out of the cushions or other damping elements, which have a damping effect in the conveying direction as well as transversely to the conveying direction.

As soon as a removal of the workpiece carrier 35 out of the main conveyor track 22 into the removal track 29 is to take place, the end section 52 in the transfer station 38 is placed into a center position, so that a detent 64 arranged on the inward located conveying track 37 blocks in the conveying direction. The workpiece carrier 35 comes to rest against the detent 64. In the course of this sudden stopping movement the end section 52 of the removal track 29 is subjected to a transverse force, which can be absorbed by the damping element and compensated.

It is furthermore assured by means of such an elastic compensation, that the end areas 52, 53 of the removal track 29 can be positioned in different positions independently in respect to each other, since the damping elements 62 are also embodied to be elastic and yielding in the conveying direction.

The passive conveying track section 43 in the end section 53 of the removal track 29 is brought into different vertical positions analogously in place of the driven conveying track section 37 in the end section 52.

Different vertical positions of the end areas 52 and 53 of the removal track 29 are represented in FIGS. 3, 4 and 5. This also applies to the inserting track 32. These FIGS. 3 to 5 only represent a selection of possible arrangements, wherein a lower, center and upper vertical position of the removal track 29 in the transfer station 38 is shown by way of example for letting the workpiece carrier 35 pass, to stop it or to lift it out of the main conveyor track 22 in order to be subsequently conveyed off transversely to the main conveying direction. The vertical positions of the end section 53 in the transfer station 39 have been arbitrarily selected.

A lateral view of the removal track 29 is represented in FIG. 3. The removal track 29 has a drive 66, which drives the outward and inward located conveying track 36, 37. The removal track 29 is seated via the damping element 62 in respect to the lifting unit 54 in the end section 52. The end section 52 is arranged in a lower vertical position 67. In this vertical position the end section 52 is lowered downward sufficiently far so that a detent 64, which projects out the conveying plane of the inward and outward located conveying track 36, 37, is positioned underneath the conveying plane of the main transport track 22. In this lower vertical position 67 the workpiece carrier 35 can pass through the transfer station 38 and can be moved on in the conveying direction.

As represented by way of example, the end section 53 can be arranged in an upper vertical position 71. In this position a removed workpiece carrier 35 can move into the transfer station 39.

In FIG. 4 the end section 52 has been moved into a center vertical position 68. Such a signal is issued by a control in those cases where it is intended to transfer the workpiece carrier 35 via the removal track 29 to the processing station 33 in the auxiliary conveyor section 26. In the center vertical position 68 the detent 64 projects past the conveying plane of the main conveyor track 22, by means of which the workpiece carrier 35 is stopped in the transfer station 38.

In respect to the upper vertical position 71 in accordance with FIG. 3, the end section 53 has been moved into a center vertical position 72, by means of which the workpiece carrier 35 is placed on the auxiliary conveyor track 26.

In FIG. 5 it has been detected by means of a signal transmitter, not shown, that a workpiece carrier 35 has entered the transfer station 38 and has been positioned, because of which the control issues a signal os that the end section 52 of the removal track 29 is moved into an upper vertical position 69 for lifting the workpiece carrier 35 out of the transfer station 38 and to convey it off in the conveying direction of the removal track 29.

After the workpiece carrier 35 has been conveyed out of the transfer station 38 and the transfer station 39 has received a signal via a signal transmitter, that no workpiece carrier 35 is positioned therein, the end section 53 is moved into an upper vertical position 71, so that the workpiece carrier 35 lifted out of the main track 22 can enter the transfer station 39. As soon as a signal transmitter of the transfer station 39 has detected that the workpiece carrier 35 is completely positioned in the transfer station 39, the end section 53 is moved into a lower vertical position, so that the former can be placed on the auxiliary conveyor track 26 and subsequently transported away.

This inserting and removal process as described for the removal track 29 in FIGS. 3 to 5, analogously applies to the inserting track 31. In this case the main conveyor track 22 and the auxiliary conveyor track 26 remain in a position of rest.

Monitoring of the transfer stations 38, 39, 44, 51 is made possible by signal transmitters. In the same way it is possible to provide separating elements in front of each transfer station 38, 39, 44, 51 which are connected with the signal transmitters monitoring the transfer stations 38, 39, 44, 51, so that a trouble-free operation can be assured.

We claim:

1. A conveying system for transporting workpiece carriers, comprising a main conveyor track; an auxiliary conveyor track arranged parallel to said main conveyor track; at least one transverse conveyor track arranged between said main conveyor track and said auxiliary conveyor track and arranged transversely in respect to said main conveyor track and forming a transfer station having a width determined by the lateral dimension of said auxiliary track; pivotably up-and-downward moveable end section provided in said transverse conveyor track and transferring the workpiece carriers from said transverse conveyor track to said auxiliary conveyor track, said main, auxiliary and transverse conveyor tracks each being formed as dual belt conveyors with an inwardly located conveying track and an outwardly located conveying track, said inward located conveying track of said transverse conveyor track being shorter than the outward track width of said transfer station; a passive conveying track section which follows said inward located conveying track and disposed in said transfer station to terminate at a distance from the end of said auxiliary conveyor track, said transverse conveyor track being rigid over its entire conveying length, said transfer conveyor track having end sections arranged in said transfer station for up and down motion.

2. A conveying system as defined in claim 1, wherein said end sections of said transverse conveyor track are movable up and down independently of each other.

3. A conveying system as defined in claim 1, wherein said transverse conveyor track has at least one lifting unit disposed in said end sections.

4. A conveying system as defined in claim 1; and further comprising damping means arranged so that said end sections of said transverse conveyor track are seated in respect to said lifting unit by said damping means.

5. A conveying system as defined in claim 4, wherein said damping means is deflectable as a function of a tilting movement of said transverse conveyor track resulting from a lifting movement.

6. A conveying system as defined in claim 4, wherein said damping means is arranged in respect to said transverse conveyor track so as to compensate forces directed transversely to conveying directions.

7. A conveying system as defined in claim 4, wherein said damping means is located between said inward located conveying track and said outward located conveying track.

8. A conveying system as defined in claim 1, wherein said transverse conveyor track has an end section containing a passive conveying track section and an oppositely located end section, said inwardly located conveying track and said outwardly conveying track having ends of a same length.

9. A conveying system as defined in claim 8, wherein said main conveyor track and said auxiliary conveyor track have said end section containing said passive conveying track section and an oppositely located end section, said inward located conveyor track being shortened by at least an amount of said outward located conveying track of said transverse conveyor which enters said transfer station transversely.

* * * * *